United States Patent [19]

Barnes, Jr. et al.

[11] Patent Number: 4,743,418
[45] Date of Patent: * May 10, 1988

[54] PROCESS FOR CHARGE MODIFYING A MICROPOROUS MEMBRANE

[75] Inventors: Robert G. Barnes, Jr., Meriden; Chaokang Chu, East Hartford; George T. Emond, Southington, all of Conn.; Asit K. Roy, Seguin, Tex.

[73] Assignee: Cuno Incorporated, Meriden, Conn.

[*] Notice: The portion of the term of this patent subsequent to Sep. 25, 2001 has been disclaimed.

[21] Appl. No.: 642,211

[22] Filed: Aug. 17, 1984

Related U.S. Application Data

[63] Continuation of Ser. No. 268,543, May 29, 1981, Pat. No. 4,473,475.

[51] Int. Cl.$^4$ .............................................. B01D 13/00
[52] U.S. Cl. ............................. 264/48; 210/638; 210/490
[58] Field of Search ................. 204/296; 521/27; 210/638, 654, 653, 500.2, 490, 491, 493.5; 264/48

[56] References Cited

U.S. PATENT DOCUMENTS

| | | | |
|---|---|---|---|
| 2,782,884 | 3/1957 | Lovell et al. | 210/203 |
| 2,783,894 | 3/1957 | Lovell | 210/203 |
| 2,926,116 | 2/1960 | Keim | 162/164 |
| 2,926,154 | 2/1960 | Keim | 260/29.2 |
| 3,152,061 | 10/1964 | Nishihara et al. | 204/296 |
| 3,158,532 | 11/1964 | Pall et al. | 210/503 |
| 3,224,986 | 12/1965 | Butter et al. | 260/9 |
| 3,242,073 | 3/1966 | Guebert et al. | 210/64 |
| 3,311,594 | 3/1967 | Earle, Jr. | 260/77.5 |
| 3,332,901 | 7/1967 | Keim | 260/29.2 |
| 3,352,424 | 11/1967 | Guebert et al. | 210/502 |
| 3,382,096 | 5/1968 | Boardman | 117/139.5 |
| 3,408,315 | 10/1968 | Paine | 260/2.5 |
| 3,497,451 | 2/1970 | Hoehn et al. | 210/500 X |
| 3,556,305 | 1/1971 | Shorr | 210/490 |
| 3,556,992 | 1/1971 | Massuco | 210/23 |
| 3,567,631 | 3/1971 | Lukach et al. | 210/500 X |
| 3,615,024 | 10/1971 | Michaels | 210/490 |
| 3,642,668 | 2/1972 | Bailey et al. | 264/49 |
| 3,700,623 | 10/1972 | Keim | 162/164 |
| 3,761,350 | 6/1973 | Munjat et al. | 162/164 |
| 3,808,305 | 4/1974 | Gregor | 264/331 |
| 3,876,738 | 4/1975 | Marinaccio et al. | 264/49 |
| 3,892,665 | 7/1975 | Steigelmann et al. | 210/490 |
| 3,928,517 | 12/1975 | Knight | 264/38 |
| 3,944,485 | 3/1976 | Rembaum et al. | 210/24 |
| 3,945,927 | 3/1976 | Imai et al. | 210/500.2 |
| 3,951,815 | 4/1976 | Wrasidlo | 210/500 X |
| 4,005,012 | 1/1977 | Wrasidlo | 210/500.2 X |
| 4,007,113 | 2/1977 | Ostreicher | 210/23 R |
| 4,007,114 | 2/1977 | Ostreicher | 210/23 R |
| 4,012,324 | 5/1977 | Gregor | 210/500 X |
| 4,014,798 | 3/1977 | Rembaum | 210/500.2 |
| 4,045,352 | 8/1977 | Rembaum et al. | 210/500.2 |
| 4,125,462 | 11/1978 | Latty | 210/500.2 X |
| 4,148,606 | 4/1979 | Morita et al. | 422/21 |
| 4,176,156 | 11/1979 | Asanuma et al. | 422/25 |
| 4,178,438 | 12/1979 | Hasse et al. | 536/30 |
| 4,203,847 | 5/1980 | Grandine | 210/490 |
| 4,203,848 | 5/1980 | Grandine | 210/490 |
| 4,214,020 | 7/1980 | Ward et al. | 427/296 |
| 4,230,573 | 11/1980 | Kilty et al. | 210/500 X |
| 4,239,714 | 12/1980 | Sparks et al. | 264/45.5 |
| 4,247,498 | 1/1981 | Castro | 264/41 |
| 4,250,029 | 2/1981 | Kiser et al. | 210/652 |
| 4,265,745 | 5/1981 | Kawaguchi et al. | 210/500.2 X |
| 4,305,782 | 12/1981 | Ostreicher et al. | 210/503 X |
| 4,340,479 | 7/1982 | Pall | 210/490 |
| 4,340,480 | 7/1982 | Pall et al. | 210/490 |
| 4,360,434 | 11/1982 | Kawaguchi et al. | 521/27 X |
| 4,411,795 | 10/1983 | Olson | 210/679 |
| 4,473,474 | 9/1984 | Ostreicher et al. | 210/636 |

FOREIGN PATENT DOCUMENTS

0005536 11/1979 European Pat. Off. .
0087228 8/1983 European Pat. Off. .
0090483 8/1983 European Pat. Off. .

OTHER PUBLICATIONS

Deutsch et al., "Isolation of Lipids from Plasma by Affinity Chromatography", Biochemical and Biophysical Research Communications, vol. 50, No. 3, 1973, pp. 758-764.

(Continued on next page.)

Lukaszewicz et al., Journal of Parenteral Drug Association, Jul.-Aug. 1979, vol. 33, #4, pp. 187-194.
Pall et al., Colloids and Surfaces 1 (1980), pp. 235-256.
Zierdt, Charles, "Adherence of Bacteria . . . ", Applied and Environmental Microblgy., Dec. 1979, pp. 1166-1172.
Ostreicher, U.S. application Ser. No. 358,822, filed May 9, 1973.

Primary Examiner—Frank Spear
Attorney, Agent, or Firm—Michael E. Zall

[57] ABSTRACT

A cationic charge modified microporous membrane is provided. The membrane comprises a hydrophilic organic polymeric microporous membrane having bonded thereto, through a cross-linking agent, a charge modifying amount of a cationic charge modifying agent. The charge modifying agent is an aliphatic amine or polyamine, preferably tetraethylene pentamine, and the cross-linking agent is an aliphatic polyepoxide having a molecular weight of less than about 500, preferably 1, 4 butanediol diglycidyl ether. The microporous membrane is preferably nylon. The process for applying the charge modifying agent to the membrane, preferably comprises contacting the membrane with an aqueous solution of the charge modifying agent and then contacting the membrane with a substantially aqueous solution of the cross-linking agent. The preferred process uses high purity water, i.e. water having no significant ionic content, to produce a membrane suitable for use in filtering ultra pure (18 megohm-cm resistivity) water for use in producing electronic devices. Such a membrane exhibits an advantageously low "flush-out" time compared to known cationic charge modified microporous membranes and unmodified microporous membranes.

22 Claims, No Drawings

OTHER PUBLICATIONS

Hofstee, "Hydrophobic and Other Non-Ionic Parameters in Protein Separation and Adsorptive Immobilization by Substituted Agaroses," Polymer Science & Technology, vol. 16, Polymeric Separation Media, Edited by Anthony R. Cooper, Copyright 1982 (A collection of manuscripts based on presentations at a symposium, Polymeric Separation Media, organized for the Second Chemical Congress of the North American Continent, held in Las Vegas, Aug. 24–29, 1980), pp. 87–92.

Repetti, Def. Pub. T 103601, 11/1/83.

Knight, R. A., et al., "Microporous Membranes as Depth Filters", World Filtration Congress III, 9/13 to 17/1982.

AMF Brochure 2P 20.35.

Brock, Membrane Filtration: "Users Guide and Reference Manual", Science and Tech., Inc., 1983, pp. 5–25, 98–102, 282–291.

Parrett, "Membranes"—Succeeding by Separating", Technology, vol. 3, Mar./Apr., 1982, pp. 16–29.

Lonsdale, "The Growth of Membrane Technology", Journal of Membrane Science, 10 (1982), 81–181.

Perry's, Chemical Engineers Handbook, Fourth Edition, McGraw Hill Book Co., Inc., 1963.

Ostreicher et al., U.S. application Ser. No. 164,797, filed Jun. 30, 1980.

Wallhauser, Journal of Parenteral Drug Association, Jun. 1979, vol. 33, #3, pp. 156–170.

Howard et al., Journal of Parenteral Drug Association, Mar.–Apr. 1980, vol. 34, #2, pp. 94–102.

Brown et al., CRC Critical Reviews in Environment Control, Mar. 1980, p. 279.

Wenk, Electronic and Chemical Aspects of Water Filtration, Filtration and Separation, May/Jun. 1974.

Tanny et al., Journal of the Parenteral Drug Assoc., Nov.–Dec. 1978, vol. 32, #6, pp. 258–267.

Tanny et al., Journal of the Parenteral Drug Association, Jan.–Feb., 1979, vol. 33, #1, pp. 40–51.

PROCESS FOR CHARGE MODIFYING A MICROPOROUS MEMBRANE

This is a continuation of Ser. No. 268,543 filed on May 29, 1981, now U.S. Pat. No. 4,473,475, the entire disclosure of which is incorporated herein by reference.

BACKGROUND OF THE INVENTION

1. Field of the Invention

This invention relates to microporous membranes and more particularly to cationic charge modified microporous membranes suitable for the filtration of high purity water as used in the electronics industry.

2. Prior Art

Microporous membranes are well known in the art. For example, U.S. Pat. No. 3,876,738 to Marinaccio et al (1975) describes a process for preparing a microporous membrane, for example, by quenching a solution of a film forming polymer in a non-solvent system for the polymer. European Patent Application No. 0 005 536 to Pall (1979) describes a similar process to Marinaccio et al.

Other processes for producing microporous membranes are described for example, in the following patents:

U.S. Pat. No. 2,783,894 to Lovell et al;
U.S. Pat. No. 3,642,668 to Bailey et al;
U.S. Pat. No. 4,203,847 to Grandine, II;
U.S. Pat. No. 4,203,848 to Grandine, II; and
U.S. Pat. No. 4,247,498 to Castro.

Attempts have also been made to charge modify microporous membranes. For example, U.S. Pat. No. 4,125,462 to Latty (1978) describes a coated membrane having a layer or coating of a cationic polyelectrolyte, preferably poly(vinylimidazoline) in the bisulfate form. Other types of charge modified membranes are described in, for example, U.S. Pat. No. 3,556,992 to Massucco; U.S. Pat. No. 3,556,305 to Shorr; U.S. Pat. No. 3,808,305 to Gregor; and U.S. Pat. No. 4,250,029 to Kiset et al.

In the assignee's U.S. Ser. No. 201,366 filed Oct. 27, 1980 by Ostreicher et al now abandoned, and copending U.S. Ser. No. 06/314,307, filed on Oct. 23, 1981, now U.S. Pat. No. 4,473,474, which is a continuation-in-part of U.S. Ser. No. 201,366 a particularly preferred charge modified microporous membrane is described. The membrane, preferably nylon, comprises a multiplicity of cationic charge sites on the internal pore surfaces. The charge sites are provided by a cationic charge modifying resin, in particular a polyamido-polyamine epichlorohydrin resin, bonded to the membrane structure. The membrane is further provided with a cross-linking agent for the charge modifying resin which is effective in retaining the resin on the membrane. A preferred cross-linking agent is a polyamine, e.g. tetraethylene pentamine. Such a membrane is sold under the Trademark Zetapor by AMF Cuno, Meriden, Conn.

The primary advantage of a charge modified microporous membrane is the exclusion of particulate on the basis of charge as well as size; thus, for example, viruses can be removed from a fluid without having to go to an ultrafiltration membrane with its associated high pressures.

In the production of solid state electronic devices, e.g. computer chips, it is critical that any water utilized in the production process be of the highest possible purity in terms of freedom from both dissolved and undissolved contaminants. Normally, filtered 18 megohm-cm resistivity water is used in such applications. Such water is generally produced by activated carbon and ion exchange deep bed treatments (to remove dissolved organic and inorganic contaminants) followed by filtration (to remove small particulate and undissolved contaminants). Given the practical cost and particle size removal limitations of conventional mechanical barrier type filters, vis-a-vis charge modified filters, the present filtration systems are not completely satisfactory in terms of removal of colloidal contaminants, waterborne bacteria, etc. Additionally, without exception, all of the known filtration media seriously reduce the resistivity of the deionized water being filtered by introducing a significant amount of inorganic ionic contamination to the water. While conventional polymeric membrane filters which are not charge modified suffer from this defect to some degree, they tend to flush out very rapidly, e.g. within 5 to 30 minutes. Such a flush out procedure is a normal part of the water system start up after changing a filter. Such mechanical barrier type membrane filters remove small particulate and undissolved contaminants, by providing a sufficiently small effective pore dimension to remove, by mechanical straining, the undesired contaminants. Such filter structure, in the form of microporous membranes of, for example, 0.1 micrometer rating or less, may be readily prepared. Such membranes tend to flush out very rapidly, however, the flow rates exhibited by such structures at conventional pressure drops are prohibitively limited. Increasing the pressure drop through the membrane to provide the desired flow rate is generally not feasible, even with costly replacement or modification of existing pumping equipment. This is due to the fact that pressure drop is a function of the fourth power of flow rate.

While it would appear advantageous to use a cationically charge modified filter media, e.g. a microporous membrane, to provide for the economical and effective removal of undissolved particulate contaminants, current state of the art media exhibit certain characteristics that prevent their use in such applications. Currently available charge modified microporous media, for example, the aforementioned Zetapor cationically modified nylon membrane prepared in accordance with the aforementioned U.S. Ser. No. 201,366, now abandoned, exhibit an extremely slow flush out characteristic, i.e. up to several hours. This characteristic has prevented the use of such charge modified media in such high purity electronic water systems.

OBJECTS AND SUMMARY OF THE INVENTION

It is an object of this invention to provide a novel cationic charge modified microporous membrane.

It is a further object of this invention to provide a process for cationically charge modifying a hydrophilic organic polymeric microporous membrane.

It is a further object of this invention to provide a process for the filtration of fluid, and in particular the filtration of high purity water used in the electronics industry.

It is a further object of this invention to provide a cationic charge modified microporous membrane which has rapid flush out characteristics suitable for the electronics industry.

These and other objects of this invention are attained by a novel cationic charge modified microporous membrane. The membrane comprises a hydrophilic organic polymeric microporous membrane and a charge modifying amount of a cationic charge modifying agent bonded to the microporous membrane structure through an aliphatic polyepoxide cross-linking agent having a molecular weight of less than about 500.

The charge modifying agent is selected from the group consisting of:
 (i) aliphatic amines having at least one primary amine or at least two secondary amines; and
 (ii) aliphatic amines having at least one secondary amine and a carboxyl or hydroxyl substituent.

The invention is further directed to a process for cationically charge modifying a hydrophilic organic polymeric microporous membrane by applying to the membrane the aforesaid charge modifying agent bonded to the membrane through the aforesaid cross-linking agent.

The preferred microporous membrane is nylon, the preferred polyamine is tetraethylene pentamine and the preferred polyepoxide is 1,4-butanediol diglycidyl ether.

Preferably, the process for charge modifying the microporous membrane comprises contacting the membrane with an aqueous solution of the polyamine and subsequently contacting the membrane with a substantially aqueous solution of the polyepoxide. The aqueous solutions are preferably prepared from high purity water having no significant ionic content.

The membrane may be used for filtration of fluids, but is particularly suitable for the filtration of high purity water used for producing electronic devices, e.g. computer chips.

DETAILED DESCRIPTION OF THE INVENTION

The cationic charge modified microporous membrane of this invention is produced from a hydrophilic organic polymeric microporous membrane. Such membranes are well known in the art. A preferred microporous membrane is one produced from nylon. The preferred membrane substrates are produced by the method disclosed in U.S. Pat. No. 3,876,738 to Marinaccio et al. Another method of producing such membranes is described in U.S. Pat. No. 4,340,470 to Pall. The entire disclosures of both of these references are incorporated herein by reference.

Additionally, any of the hydrophilic microporous membranes commercially available, for example, Pall Corp.'s ULTIPOR NM, having characteristics potentially suitable for fine filtration of fluids, particularly high purity water are suitable for treatment in accordance with this invention.

Preferably, the membrane is prepared from a hydrophilic synthetic linear relatively high molecular weight polymeric substance, most preferably a polyamide such as polyhexamethylene adipamide (Nylon 66). This nylon polymer may be converted into membrane form without humectants, plasticizers or similar additives; is wettable by aqueous liquids; and offers the flexibility, stability and chemical properties suitable for use in filtration. While other polyamides, e.g. Nylon 6, are also suitable, for ease of conversion into the membrane form, chemical resistance, strength and other considerations, Nylon 66 is preferred.

The conversion of the polymer into a microporous membrane may be conducted by methods described in the art, but in particular, the method described in U.S. Pat. No. 3,876,738 to Marinaccio et al is preferred. The Marinaccio et al process develops a unique fine internal microstructure through the quench technique described therein, offering a superior substrate for filtration.

These preferred nylon membranes, are characterized by an isotropic structure, having a high effective surface area and a fine internal microstructure of controlled pore dimensions with narrow pore size distribution and adequate pore volume. Thus, a representative 0.22 micrometer rated Nylon 66 membrane (polyhexamethylene adipamide) exhibits an initial bubble point of about 45 to 50 psid., a foam all over point of about 50 to 55 psid, provides a flow of from 70 to 80 ml/min of water at 5 psid (47 mm. diameter discs), has a surface area (BET, nitrogen absorption) of about 13 $m^2g$ and a thickness of about 4.5 to 4.75 mils.

By the use of the term "hydrophilic" in describing the microporous membrane, it is meant a membrane which absorbs or adsorbs water. Generally, such hydrophilicity is produced by hydroxyl ($OH^-$), carboxyl (—COOH) and/or amino (—$NH^2$) substituents on the surface of the membrane. Such substituents assist in the absorption or adsorption of the water onto the membrane. Such hydrophilicity of the membrane, i.e., presence of hydroxyl, carboxyl and amino substituents, is a necessary element of this invention to provide the adequate bonding of the charge modifying agent through the cross-linking agent to the microporous membrane.

The charge modifying agent used in this invention is selected from the group consisting of:
 (i) aliphatic amines having at least one primary amine or at least two secondary amines; and
 (ii) aliphatic amines having at least one secondary amine and a carboxyl or hydroxyl substituent.

Preferably, the charge modifying agent is a polyamine having the formula:

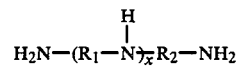

wherein $R_1$ and $R_2$ are alkyl of 1 to 4 carbon atoms and x is an integer from 0 to 4. Preferably, $R_1$ and $R_2$ are both ethyl.

Preferred polyamines are:
Ethylene Diamine: $H_2N$—$(CH_2)_2$—$NH_2$
Diethylenetriamine: $H_2N$—$(CH_2)_2$—$NH$—$(CH_2)_2$—$NH_2$
Triethylenetetramine: $H_2N$—$(CH_2$—$CH_2$—$NH)_2$—$CH_2$—$CH_2$—$NH_2$
Tetraethylenepentamine: $H_2N$—$(CH_2$—$CH_2$—$NH)_3$—$CH_2$—$CH_2NH_2$ The highly preferred polyamine is tetraethylene pentamine.

Alternatively, aliphatic amines used in this invention may have at least one secondary amine and a carboxyl or hydroxyl substituent. Exemplary of such aliphatic amines are gamma-amino-butyric acid ($H_2NCH_2CH_2CH_2COOH$) and 2-aminoethanol ($H_2NCH_2CH_2OH$).

The charge modifying agent is bonded to the microporous membrane structure through an aliphatic polyepoxide cross-linking agent having a molecular weight of less than about 500. Preferably, the polyepoxide is a di- or tri-epoxide having a molecular weight of from about 146 to about 300. Such polyepoxides have viscosities (undiluted) of less than about 200 centipoise at 25 C.

Highly preferred polyepoxides have the formula:

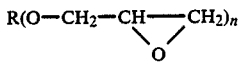

wherein R is an alkyl of 1 to 6 carbon atoms and n is from 2 to 3. The limitation that the number of carbon atoms in the non-epoxide portion —(R)— be less than 6 is so that the polyepoxide will be soluble in water or ethanol-water mixtures, e.g. up to 20% ethanol. While higher carbon content materials are functionally suitable, their application would involve the use of polar organic solvents with resulting problems in toxicity flammability and vapor emissions.

It is preferred that certain diglycidyl ethers of aliphatic diols be used as the polyepoxide cross-linking agents. These are generally produced by reacting an aliphatic diol with epichlorohydrin under appropriate reaction conditions. The reaction may be represented as follows:

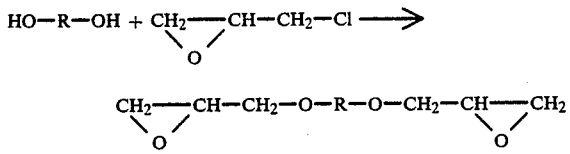

For example:
When R is (CH$_2$)$_2$, HO—R—OH is 1,2-ethanediol
When R is (CH$_2$)$_3$, HO—R—OH is 1,3-propanediol
When R is (CH$_2$)$_4$, HO—R—OH is 1,4-butanediol The diglycidyl ether of 1,4-butanediol, the preferred polyepoxide cross-linking agent, is commercially available from Ciba-Geigy, Inc. as RD-2 and from Celanese Corp. as EPI-REZ 5022.

Other higher carbon diglycidyl ethers may be used as the polyepoxide cross-linking agent, for example when R is (CH$_2$)$_5$ the 1,5-pentanediol diglycidyl ether is produced. As stated previously, however, the appropriate polar organic solvents must be used for diluting such polyepoxides.

Triglycidyl ethers, i.e. tri-epoxides may also be utilized as the polyepoxide cross-linking agent. For example, the triglycidyl ether of glycerol may be utilized. This tri-epoxide may be produced by the following reaction:

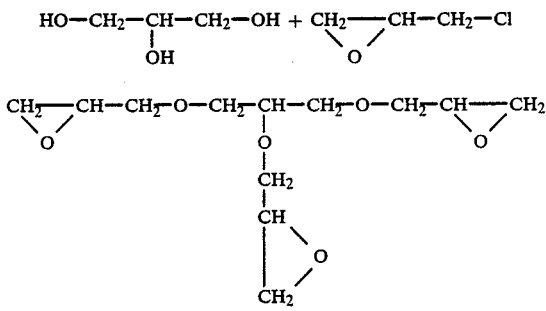

The triglycidyl ether of glycerol is available from Shell, Inc. as EPON 812 and from Celanese Corp. as EPI-REZ 5048.

The amount of cationic charge modifying agent utilized is an amount sufficient to enhance the electropositive capture potential of the microporous membrane. Such an amount is highly dependent on the specific charge modifying agent utilized.

Broadly, the process of this invention is directed to cationically charge modifying a hydrophilic organic polymeric microporous membrane, e.g. nylon. The process comprises applying to the membrane a charge modifying amount of the cationic charge modifying agent bonded to the membrane structure through the polyepoxide. Preferably, the process comprises (a) contacting the membrane with an aqueous solution of the cationic charge modifying agent and (b) contacting the membrane with an aqueous solution of the polyepoxide crosslinking agent. The contacting steps may be performed in any order, i.e. step (a) prior to step (b) or vice versa. Such contacting steps also include contacting the membrane with an aqueous solution of a mixture of the charge modifying agent and the polyepoxide cross-linking agent. It is preferred, however, for optimum (minimum) flushout times to first contact the membrane with the aqueous solution of the cationic charge modifying agent and then subsequently contact the so treated membrane with the aqueous solution of the polyepoxide cross-linking agent. It is preferred, however, for maximizing charge modification to contact the membrane with an aqueous solution of a mixture of the charge modifying agent and the polyepoxide cross-linking agent.

In order to provide the charge modifying amount of cationic charge modifying agent for the membrane, it is preferred that the aqueous solution of charge modifying agent that the membrane is contacted with contain at least about 0.25% charge modifying agent, by weight of the solution, preferably a polyamine. The maximum amount of charge modifying agent in the aqueous solution is limited by economic and solubility limitations. For example, an excess of charge modifying agent which is not bonded to the microporous membrane will not be economically utilized and will constitute an extractive from the membrane. It has been found that the amount of charge modifying agent in the aqueous solution should probably not exceed about 1% by weight of the solution.

The amount of polyepoxide used in the aqueous solution is highly dependent on the specific polyepoxide and the amount and type charge modifying agent used, and the cross-linking mechanism between these compounds to provide the bonding of the charge modifying agent to the microporous membrane. For general guidance however, it has been found that a weight ratio of polyepoxide to charge modifying agent of from about 2:1 to about 10:1, preferably from about 3:1 to about 5:1, in the aqueous solution(s) contacted with the membrane, is generally sufficient to provide the bonding of the cationic charge modifying agent to the membrane through the polyepoxide cross-linking agent. It has been found that if the aqueous solution containing the polyepoxide contains at least about 1% polyepoxide by weight of the solution, up to a maximum of about 4% polyepoxide by weight of the solution when used in conjunction with the aforementioned aqueous solution of charge modifying agent, that adequate bonding of the charge modifying agent to the microporous membrane is obtained.

Both the charge modifying agent and the polyepoxide cross-linking agent may be contacted with the membrane by dipping the membrane in the aqueous solution(s) of these compounds for a period of time sufficient to effect the desired degree of pick-up. Alternatively, the charge modifying agent and/or cross-linking agent may be applied by spraying or contacting a wick or roll along the surface of the microporous membrane.

In the highly preferred process for producing a microporous membrane for use in filtering high purity water for the electrical industry, the aqueous solution of charge modifying agent and polyepoxide are produced with water having no significant ionic content. Such water should have a resistivity of at least about 250,000 ohm-cm. Production of the membrane with such water is desirable so that the membrane is not ionically contaminated.

Although applicants do not wish to be bound by the following theory, it is believed that in bonding the charge modifying agent to the microporous membrane the polyepoxide not only acts as a cross-linking coupling agent but also functions to a certain degree to enhance the cationic charge modification produced. It is theorized that the epoxide groups on the polyepoxide cross-linking agent enter into an addition type reaction with the hydroxyl, carboxyl and primary and secondary amines, which are on the hydrophilic microporous membrane and the cationic charge modifying agent. These reactions may be represented as follows:

Hydroxyl

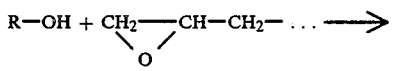

$$R-O-CH_2-\underset{OH}{CH}-CH_2- \ldots$$

Carboxyl

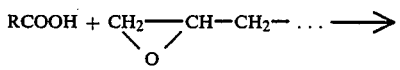

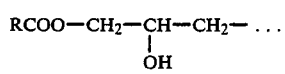

Primary Amine

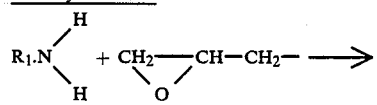

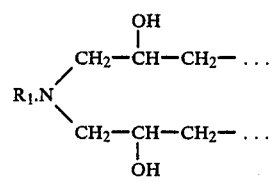

Secondary Amine

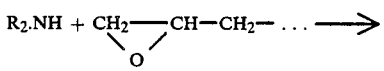

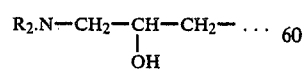

The polyepoxide cross-linking agent thus serves several functions:

1. The polyepoxide cross-links the primary amine groups on the hydrophilic membrane to the primary and/or secondary amine groups on the cationic charge modifying agent;

2. The polyepoxide cross-links the carboxyl groups on the hydrophilic microporous membrane to the primary and/or secondary amine groups of the cationic charge modifying agent;

3. The polyepoxide cross-links the primary and/or secondary amines of the charge modifying agent to each other.

Due to the necessity for the cross-linking agent to function in such a manner, monoepoxides, e.g. glycidyl ethers, are unsuitable for use in this invention. Similarly, it is theorized that a polyepoxide offering greater than three epoxide groups offers no benefit, and in fact may limit the coupling reactions of the polyepoxide by steric hindrance. Additionally, the presence of unreacted epoxide groups on the charge modified microporous membrane may be undesirable in the finished charge modified membrane.

The amines used in this invention are selected in view of the following theoretical considerations. Amines are classified as primary, secondary or tertiary, according to the number of substituents attached to the nitrogen atom, i.e. according to the number of hydrogens which have been substituted:

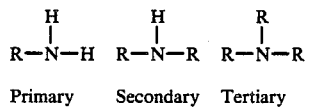

Primary    Secondary    Tertiary

Epoxide groups will react with primary and secondary amine groups through the free hydrogens. An epoxide group will not react with a tertiary amine group since there are no free hydrogens.

Amine groups of all three classes, i.e. primary, secondary or tertiary are capable of forming hydrogen bonds with water. As a result, amines of relatively low molecular weight, i.e. short carbon chain length are quite soluble in water, with border line solubility in water occurring at about 6 carbon atoms per amine group. In the preferred embodiment of this invention it is highly desirable that the cationic charge modifying agent be soluble in water to provide the desired environment for production, i.e., elimination of fumes, toxicity, etc.

Amines are basic and generally form salts:

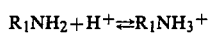

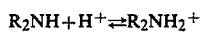

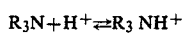

The amines are converted into their salts, i.e. charged form, by hydrogen ions and are liberated from their salts by hydroxide ions:

It is this latter characteristic, that produces an undesirable reduction in positive surface charge on the microporous membrane (as measured by electrophoretic mobility or streaming potential), and the corresponding reduction in adsorptive capacity for anionic contaminants that has been noted when amine charge modified filter media is tested over a series of increasing pHs. It would therefore appear that the more basic the amine charge modifying agent, the higher is the charge modification and adsorptive capacity for contaminants that a filter media, e.g. membrane, will exhibit at a given pH.

Basicity of an amine is defined by measuring the extent to which the amine can accept hydrogen ions from water, with the equilibrium constant for this reaction being the basicity constant Kb:

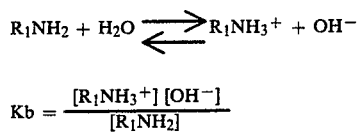

$$K_b = \frac{[R_1NH_3^+][OH^-]}{[R_1NH_2]}$$

From the literature, we find that aliphatic amines of all three classes, i.e. primary, secondary and tertiary, have Kb's that range from about $10^{-3}$ to $10^{-4}$, and are stronger bases than ammonia. This 10 to 1 range of Kb for aliphatic amines indicates that some amines will be better charge modifiers (high Kb) than others (low Kb). It is theorized that aromatic amines, which are considerably weaker bases than ammonia, having a Kb of $10^{-9}$ or less, are unsuitable as charge modifying agents.

To select from among the aliphatic amines a preferred embodiment on a theoretical basis becomes somewhat more complicated, due to the fact that one is concerned with the basicity of the amine bonded through the polyepoxide to the microporous membrane. From Applicants' testing (see Examples) it appears as through the basicity of the cross-linked tetraethylene pentamine (as measured by dye absorption capacity at pH 7.0) increases with increased epoxide level, i.e. increased cross-linking of the amine. This would appear to indicate increasing basicity (and thus filtration effectiveness) as the extent to which the primary and secondary amines originally present in the tetraethylene pentamine, are converted to tertiary amines via the reaction with the epoxide.

Preferably, when the two step process for producing the membrane is used, the membrane between the contacting steps is drained for a period of time sufficient to remove most of the water and chemical compound not absorbed or adsorbed onto the surface of the membrane. Optionally, the membrane may be transferred directly from the first contacting step to the second contacting step, although this is less preferred. The intermediate treatment may also be a restrained drying step.

After the microporous membrane has been contacted with the aqueous solution(s), it is then dried and cured, preferably in a restrained condition to prevent shrinkage.

Drying of the membrane under restraint is described in the assignee's co-pending U.S. Ser. No. 201,086 to Repetti filed Oct. 27, 1980, now defensive publication T-103,601. The entire disclosure of this application is incorporated herein by reference. Generally, any suitable restraining technique may be used while drying, such as winding the membrane tightly about a drying surface, e.g. a drum. Bi-axial control is preferred and tensioning the membrane on a stretching frame is considered the most preferred. Preferably, the restraint imposed affects no reduction in dimensions.

Final drying and curing temperatures should be sufficient to dry and cure the polyepoxide-amine, preferably from about 120° C. to 140° C. for minimization of drying times without embrittlement or other detrimental effects to the membrane.

The completed membrane may be rolled and stored for use under ambient conditions. It will be understood that the treated membrane may be supplied in any of the usual commercial forms, for example, as discs or pleated cartridges.

In today's processes for producing electronic components, micron and submicron sized particles can cause large enough faults in electronic circuits to cause unacceptably high reject rates, resulting in reduced yields and higher costs. The high purity water required in the manufacture of semi-conductors must contain no dissolved solids and have a resistivity of at least about 18 megohm-cm. In such critical applications, it is necessary to minimize the contaminants the filter contributes as well as maximize the contaminants the filter removes. Therefore, the filter must be flushed out prior to use, e.g. immediately after installation in the process, to remove trace amounts of soluble extractables that might alter resistivity of the water and indirectly add dissolved ionics to the water. An excellent measure of filter purity is the time required to flush out the filter to a point at which the 18 megohm-cm water suffers no loss in resistivity in passing through the filter. The cationically charged microporous membrane of this invention, as demonstrated by the Examples herein, has an extremely rapid flush out characteristic when compared with the closest prior art charge modified membrane known to applicant, i.e. the membrane described in U.S. Ser. No. 201,366 to Ostreicher et al (Zetapor from AMF Cuno) and even the non-modified membrane. This characteristic makes the charge modified microporous membrane of this invention particularly suitable for use in the filtration of high purity water, i.e. at least about 18 megohm-cm resistivity water.

Having now generally described this invention, the same will become better understood by reference to certain specific examples, which are included herein for the purposes of illustration only and are not intended to be limiting of the invention, unless no specified.

EXAMPLES

A series of tests were conducted to investigate the characteristic of the charge modified membrane of this invention and process for producing such membrane. The test procedure was designed to permit a direct comparison with the preferred embodiment described in the aforementioned, U.S. Ser. No. 201,366 and to determine the preferred embodiment of the invention described and claimed herein.

The membrane used for this test series was a single sheet of unmodified 0.2 μm nylon membrane produced pursuant to the aforementioned Marinaccio et al patent. Each Example group consisted of nine (9) adjacent 13"×16" sheets. In turn, each nine (9) piece group was divided into three (3) piece subgroups "A" and "B" and "C". The "A" group was left untreated and was used to provide baseline data for "unmodified" or "before treatment" membrane. The "B" and "C" groups were subjected to the treatment modes given in Table I. The "A"

and "B" groups were subjected to the following measurements and tests:
Thickness—4 samples, 47 mm disc
IBP[1] and FAOP[2]—4 samples, 47 mm disc
Flow—4 samples, 47 mm disc
Dye Adsorption—2 samples 47 mm disc
Flushout—2 samples, 293 mm disc
1. Initial Bubble Point
2. Foam-All-Over-Point The "C" groups were retained.

The measurement and test procedures utilized were as follows:

Thickness

The dry membrane thickness was measured with a ½ inch diameter platen dial indicator thickness gauge. Gauge accuracy was ±0.00005 inches (±0.05 mils).

Initial Bubble Point (IBP) and Foam-All-Over-Point (FAOP) Test

A 47 mm diameter disc of the membrane sample is placed in a special test holder which seals the edge of the disc. Above the membrane, and directly in contact with its upper face, is a perforated stainless steel support screen which prevents the membrane from deforming or rupturing when air pressure is applied to its bottom face. Above the membrane and support screen, the holder provides a ½ inch deep cavity into which distilled water is introduced. A regulated air pressure is introduced below the membrane and the pressure is increased until a first stream of air bubbles is emitted by the water-wetted membrane into the quiescent pool of water. The air pressure at which this first stream of air bubbles is emitted is called the Initial Bubble Point (IBP) of the largest pore in that membrane sample. Once the Initial Bubble Point pressure has been determined and recorded, the air pressure is further increased until the air flow thru the wetted membrane sample, as measured by a flow meter in the line between the regulator and the sample holder, reaches 100 cc/min. The air pressure at this flow rate, is called the Foam-All-Over-Point (FAOP), and is directly proportional to the mean pore diameter of the sample membrane. In this series of tests, these two parameters (IBP and FAOP) are used to determine if any change has occurred in the maximum or mean pore size of the membrane sample as a result of the charge modifying process utilized.

Flow Rate Test

A 47 mm diameter disc of the membrane sample is placed in a test housing which allows pressurized water flow thru the membrane. Prefiltered water is passed thru the membrane sample at a pressure differential of 5 PSID. A graduate cylinder is used to measure the volume of water passed by the membrane sample in a one minute period. In this series of tests this parameter is used in conjunction with the IBP and FAOP to determine if any reduction in pore size or pore blockage has occurred as a result of the charge modifying process utilized.

Dye Adsorption Test

A 47 mm diameter disc of the membrane sample is placed in a test housing which allows pressurized water flow thru the membrane. The challenge solution consists of distilled water at a pH of 7.0, and Metanil Yellow dye. The dye inlet concentration is adjusted to produce a 76 percent transmittance at a wavelength of 430 nm, as measured on a Perkin-Elmer Model 295 Spectrophotometer. By means of a peristalltic pump the challenge solution is flowed thru the membrane sample at a flow rate of 28 ml/min. The transmittance of the effluent is measured by passing it thru a constant flow cell in the aforementioned Spectrophotometer. The effluent transmittance and pressure drop across the membrane are measured and recorded as a function of time. The test is terminated when the effluent transmittance increases to 85 percent of the inlet transmittance. In this series of tests, the length of time that it takes to reach the 85 percent transmittance in the effluent is called the "breakthur" time. Since the Metanil Yellow is a low molecular weight anionic dye incapable of being mechanically removed (filtered) by the membrane, this breakthru time is proportional to the cationic adsorptive capacity of the membrane sample. This test is therefore used to determine the effectiveness of the charge modification technique.

Flushout Test

A 293 mm diameter disc of the membrane sample is installed in a test housing which allows pressurized water flow thru the membrane. Prefiltered and deionized 18 megohm-cm water is flowed thru the membrane sample at a flow rate of 2.5 GPM. The effluent resistivity is constantly monitored. The length of time that is required for the membrane effluent to reach a resistivity of 18 megohms-cm is determined and recorded.

The results obtained from the testing of the various treatment modes (see Table I and III) are statistically summarized in Table II and IV. From these results, the following conclusions can be made:

1. The preferred embodiment charge modification treatment of the prior art (Example 190 1) gives excellent charge modification (as determined by dye adsorption) but results in unacceptably long flushout times, even when using 18 megohm-cm water to produce the membrane.

2. In any of the tested treatment modes (Examples 2 thru 15 and 18 thur 22) the charge modifying process of this invention exhibits good to excellent charge modification characteristics (as measured by dye adsorption) and extremely short flushout times. These flushout times are significantly less than that of the prior art (Example 190 1) and, even more significant, are less than those of the untreated membrane.

3. None of the treatment modes of this invention produce any pore size reduction or pore blockage.

4. In terms of optimized flushout characteristics, Example 9 would appear to represent the preferred embodiment.

A 293 mm diameter disc of Example 9B was placed in contact with Meriden city water (resistivity approximately 9000 ohm-cm) and then subjected to a flushout test. In this case, the flushout time was 30.23 minutes as compared to the 2.27 minute flushout of the original 9B sample. This demonstrates the need to use low ionic content water if one desires a membrane having rapid flushout characteristics.

5. In terms of maximized charge modification, Example 21, would appear to represent the preferred embodiment.

6. Although aqueous solutions are preferred, Example 22 shows that other solutions, e.g. non-aqueous solutions, may be utilized with no adverse effect on the membrane performance characteristics.

TABLE I

| EXAMPLE NO. | 1ST STAGE TREATMENT | INTERMEDIATE TREATMENT | 2ND STAGE TREATMENT | POST TREATMENT |
|---|---|---|---|---|
| 1 | 4308 Resin - 2 wt % sol. pH adjusted to 10.5 | Air dry and drain for 3 minutes | 0.03 wt. % sol. Pentamine | Drain and Stretch Dry |
| 2 | 1.5 wt. % DGE in 80/20 Water-Ethanol Solution | Air dry and drain for 3 minutes | 0.5 wt. % Pentamine in Water Solution | " |
| 3 | 2.0 wt % DGE in 80/20 Water-Ethanol Solution | Air dry and drain for 3 minutes | 0.5 wt. % Pentamine in Water Solution | " |
| 4 | 2.5 wt % DGE in 80/20 Water-Ethanol Solution | Air dry and drain for 3 minutes | 0.5 wt. % Pentamine in Water Solution | " |
| 5 | 1.0 wt % DGE in 80/20 Water-Ethanol Solution | Air dry and drain for 3 minutes | 0.25 wt % Pentamine in Water Solution | " |
| 6 | 4.0 wt % DGE in 80/20 Water-Ethanol Solution | Air dry and drain for 3 minutes | 1.0 wt % Pentamine in Water Solution | " |
| 7 | 0.5 wt % Pentamine in Water Solution | Air dry and drain for 3 minutes | 1.5 wt % DGE in 80/20 Water-Ethanol Solution | " |
| 8 | 0.5 wt % Pentamine in Water Solution | Air dry and drain for 3 minutes | 2.0 wt % DGE in 80/20 Water-Ethanol Solution | " |
| 9 | 0.5 wt % Pentamine in Water Solution | Air dry and drain for 3 minutes | 2.5 wt % DGE in 80/20 Water-Ethanol Solution | " |
| 10 | 1.0 wt % Pentamine in Water Solution | Air dry and drain for 3 minutes | 4.0 wt % DGE in 80/20 Water-Ethanol Solution | " |
| 11 | 0.25 wt % Pentamine in Water Solution | Air dry and drain for 3 minutes | 1.0 wt % DGE in 80/20 Water-Ethanol Solution | " |
| 12 | 2.0 wt % DGE in 80/20 Water-Ethanol Solution | Directly transfer into 2nd stage treatment | 0.5 wt % Pentamine in Water Solution | " |
| 13 | 0.5 wt % Pentamine in Water Solution | Directly transfer into 2nd stage treatment | 2.0 wt % DGE in 80/20 Water-Ethanol Solution | " |
| 14 | 2.0 wt % DGE in 80/20 Water-Ethanol Solution | Drain and Stretch Dry in Air | 0.5 wt % Pentamine in Water Solution | " |
| 15 | 0.5 wt % Pentamine in Water Solution | Drain and Stretch Dry in Air | 2.0 wt. % DGE in 80/20 Water-Ethanol Solution | " |
| 16 | None | None | Soak in high purity water | " |

4308 Resin is Hercules, Inc. R4308 resin -polyamido- polyamine epichlorydrin resin.
DGE is 1,4-butanediol diglycidyl ether.
Pentamine is tetraethylene pentamine.

TABLE II

SUMMARY OF TEST RESULTS

| EXAMPLE NO. | THICKNESS (MILS) | | INITIAL BUBBLE POINT (PSI) | | FOAM-ALL-OVER POINT (PSI) | | FLOW RATE (ML/MIN) | | DYE ADSORBTION BREAKTHRU (MIN) | | FLUSHOUT TO 18 MEGOHM (MINUTES) | |
|---|---|---|---|---|---|---|---|---|---|---|---|---|
| | B.T | A.T. | B.T. | A.T. | B.T. | A.T. | B.T. | A.T. | B.T. | A.T. | B.T. | A.T. |
| 1 | 4.68 | 4.59 | 44.9 | 45.3 | 51.8 | 50.9 | 75.0 | 86.0 | 9.9 | 49.3 | 6.90 | 69.57 |
| 2 | 4.71 | 4.69 | 45.9 | 43.4 | 51.9 | 51.0 | 78.3 | 82.5 | 9.9 | 26.3 | 8.67 | 3.02 |
| 3 | 4.56 | 4.65 | 45.6 | 45.6 | 52.0 | 51.0 | 80.8 | 79.3 | 7.9 | 34.6 | 7.90 | 3.88 |
| 4 | 4.56 | 4.76 | 44.8 | 47.5 | 51.8 | 53.6 | 81.0 | 73.8 | 7.7 | 40.0 | 16.05 | 4.03 |
| 5 | 4.61 | 4.70 | 45.9 | 46.8 | 52.1 | 52.6 | 80.3 | 77.0 | 9.4 | 16.6 | 16.58 | 4.28 |
| 6 | 4.61 | 4.73 | 47.6 | 45.3 | 52.6 | 52.5 | 76.3 | 77.3 | 10.2 | 49.4 | 8.23 | 6.48 |
| 7 | 4.58 | 4.64 | 45.8 | 46.4 | 51.9 | 52.3 | 81.5 | 80.5 | 9.3 | 22.5 | 5.88 | 1.35 |
| 8 | 4.58 | 4.65 | 47.4 | 44.8 | 52.0 | 51.5 | 81.5 | 80.0 | 8.4 | 26.5 | 5.18 | 1.78 |
| 9 | 4.58 | 4.73 | 47.1 | 44.6 | 52.3 | 50.0 | 83.0 | 80.8 | 8.8 | 36.8 | 7.70 | 2.27 |
| 10 | 4.66 | 4.76 | 44.9 | 45.3 | 51.8 | 51.3 | 74.8 | 79.8 | 8.3 | 39.2 | 9.05 | 9.02 |
| 11 | 4.58 | 4.63 | 45.6 | 46.0 | 52.9 | 52.0 | 76.5 | 81.3 | 10.7 | 21.0 | 8.10 | 1.00 |
| 12 | 4.60 | 4.63 | 45.3 | 45.3 | 52.1 | 52.5 | 76.8 | 80.5 | 10.0 | 37.2 | 8.08 | 5.60 |
| 13 | 4.56 | 4.74 | 45.0 | 46.1 | 52.6 | 52.9 | 77.3 | 78.0 | 7.7 | 23.9 | 8.33 | 1.70 |
| 14 | 4.59 | 5.25 | 46.3 | 49.0 | 52.5 | 56.0 | 75.0 | 83.8 | 8.5 | 37.3 | 10.33 | 5.07 |
| 15 | 4.60 | 4.75 | 46.3 | 46.4 | 52.8 | 53.5 | 74.8 | 76.0 | 5.5 | 26.3 | 7.33 | 4.07 |
| 16 | 4.58 | 4.74 | 46.6 | 47.0 | 53.1 | 53.5 | 76.5 | 77.0 | 5.2 | 6.75 | 8.20 | 7.65 |

B.T. is Before Treatment
A.T. is After Treatment

EXAMPLE 17

A

Nylon membrane was treated, in the preferred mode disclosed in copending U.S. Application Ser. No. 201,366, as follows:

1st stage—Hercules R 4308 PAE (polyamido polyamine epichlorhydrin) Resin 2.0 wt. % solution adjusted to pH 10.5 with NaOH.

2nd stage—Tetraethylene Pentamine, 0.03 wt. % solution.

The treated nylon was allowed to drain and then stretch dried. The treated membrane, and an untreated control, were tested by flushing out a 293 mm disc at 2 GPM with 18 megohm-cm influent resistivity water. The test results were as follows:

| Sample | Flushout Time | Final Effluent Resistivity |
|---|---|---|
| Untreated Control | 5.0 minutes | 18 megohm |
| Treated Sample | 35.0 minutes | 7.8 megohm |

B

Identical to Example 17A, except pH of 1st stage treatment was not adjusted with NaOH. The test results were as follows:

| Sample | Flushout Time | Final Effluent Resistivity |
|---|---|---|
| Treated | 3.25 minutes | 18 megohm-cm |

TABLE III

TREATMENT MODES
EXAMPLES 18-22

| EXAMPLE NO. | 1st STAGE TREATMENT | INTERMEDIATE TREATMENT | 2nd STAGE TREATMENT | POST TREATMENT |
|---|---|---|---|---|
| 18 | 2.0 wt % EGDGE in Water Solution | Air dry and drain for 3 minutes | 0.5 wt % Pentamine in Water Solution | Drain and Stretch Dry |
| 19 | 2.0 wt % EGDGE and 0.5 wt % Pentamine In Water solution | Drain and stretch dry | | |
| 20 | 2.0 wt % DGE in 80/20 Water-Ethanol Solution | Air dry and drain for 3 minutes | 0.5 wt % Pentamine in Water Solution | Drain and Stretch Dry |
| 21 | 2.0 wt % DGE and 0.5 wt % Pentamine in 80/20 Water-Ethanol Sol. | Drain and stretch dry | | |
| 22 | 2.0 wt % DGE in Acetone | Drain and dry at 150° C. for 1 minute | 0.5 wt % Pentamine in Water Solution | Drain and stretch dry |

EGDGE is 1,2-ethanediol diglycidyl ether
DGE is 1,4-butanediol diglycidyl ether
Pentamine is tetraethylene pentamine

TABLE IV

SUMMARY OF TEST RESULTS
EXAMPLES 18-22

| EXAMPLE NO. | THICKNESS (MILS) | | INITIAL BUBBLE POINT (PSI) | | FOAM ALL OVER POINT | | FLOW RATE (ML/MIN) | | DYE ADSORBTION BREAKTHRU | | FLUSHOUT TO 18 MEGOHM (MIN.) | |
|---|---|---|---|---|---|---|---|---|---|---|---|---|
| | B.T | A.T | BT | AT | BT | AT | BT | AT | BT | AT | BT | AT |
| 18 | — | — | 49.0 | 46.0 | 53.5 | 56.0 | 75 | 69 | — | 19.5 | ~10 | 3.50 |
| 19 | — | — | 49.0 | 48.0 | 53.5 | 48.5 | 75 | 71 | — | 73.5 | ~10 | 5.52 |
| 20 | — | — | 49.0 | 49.5 | 53.5 | 51.0 | 75 | 67 | — | 31.5 | ~10 | 3.31 |
| 21 | — | — | 49.0 | 49.0 | 53.5 | 54.0 | 75 | 69 | — | 96.0 | ~10 | 6.27 |
| 22 | — | — | — | — | — | — | — | — | 5.44 | 39.28 | — | 5.0 |

B.T. is Before Treatment
A.T. is After Treatment

| Sample | Flushout Time | Final Effluent Resistivity |
|---|---|---|
| Untreated Control | 5.0 minutes | 18 megohm |
| Untreated Control | 6.0 minutes | 18 megohm |
| Treated Sample | 21.0 minutes | 6.1 megohm |
| Treated Sample | 25.0 minutes | 7.75 megohm |

C

A washed and stretch dried nylon microporous membrane was treated, by immersion in a 2.0 weight percent solids 1,4-butanediol diglycid 1 ether solution prepared with an 80-20 mixture of 18 megohm-cm D.I. water and high purity ethanol. This solution exhibited a pH of 6.1-6.4. The membrane was removed from this solution and allowed to drain for approximately one minute.

The membrane is then immersed in a 0.5 weight percent solids solution of tetraethylene pentamine prepared with 18 megohm-cm D.I. water. This solution exhibited a pH of 11.2-11.4. The membrane is removed from this solution and allowed to drain for approximately one (1) minute.

The treated membrane is then stretch dried at 130° C. for five minutes.

The test results are as follows:

What is claimed is:

1. A process for cationically charge modifying a skinless hydrophilic organic polymeric microporous filter membrane having an internal microstructure throughout said membrane comprising bonding a charge modifying amount of a cationic charge modifying agent to substantially all of the membrane microstructure through an aliphatic polyepoxide cross-linking agent having a molecular weight of less than about 500, wherein the charge modifying agent is selected from the group consisting of:
   (i) aliphatic amines which are polyamines having at least one primary amine or at least two secondary amines; and
   (ii) aliphatic amines having at least one secondary amine and a carboxyl or hydroxyl substituent,
   whereby a skinless hydrophillic organic polymeric microporous filter member is produced having a charge modifying amount of a cationic charge modifying agent bonded to substantially all of the membrane microstructure.

2. A process for cationically charge modifying a skinless hydrophilic organic polymeric microporous filter membrane having an internal microstructure throughout said membrane, comprising:
   (a) contacting the membrane with an aqueous solution of a cationic charge modifying agent, wherein the charge modifying agent is selected from the group consisting of:

(i) aliphatic amines which are polyamines having at least one primary amine or at least two secondary amines; and
(ii) aliphatic amines having at least one secondary amine and a carboxyl or hydroxyl substituent,
(b) contacting the membrane with an aqueous solution of an aliphatic polyepoxide cross-linking agent of less than about 500,
whereby a skinless hydrophilic organic polymeric microporous filter membrane is produced having a charge modifying amount of a cationic charge modifying agent bonded to substantially all of the membrane microstructure without substantial pore size reduction or pore blockage.

3. The process of claim 2, wherein the contacting step (a) precedes the contacting step (b).

4. The process of claim 2, wherein the contacting step (b) precedes the contacting step (a).

5. The process of claim 2, wherein the contacting steps (a) and (b) are combined and the membrane is contacted with an aqueous solution of a mixture of the charge modifying agent and the polyepoxide.

6. The process of claim 2, wherein the aqueous solutions of charge modifying agent and polyepoxide are produced with water substantially free of ionic content.

7. The process of claim 6, wherein the water has a resistivity of at least about 250,000 ohm-cm.

8. The process of claim 2, wherein the aqueous solution of charge modifying agent contains at least about 0.25% amine by weight of the solution.

9. The process of claim 8, wherein the aqueous solution of the charge modifying agent contains up to 1% amine by weight of the solution.

10. The process of claim 2, wherein the aqueous solution of polyepoxide contains at least 1% polyepoxide by weight of the solution.

11. The process of claim 10, wherein the aqueous solution of polyepoxide contains up to about 4% polyepoxide by weight of the solution.

12. The process of claim 2, wherein the weight ratio of polyepoxide to charge modifying agent is from about 2:1 to about 10:1.

13. The process of claim 12, wherein the weight ratio is from about 3:1 to about 5:1.

14. The process of claim 1 or 2, wherein the microporous membrane is nylon.

15. The process of claim 1 or 2, wherein the microporous membrane is polyhexamethylene adipamide.

16. The process of claim 1 or 2, wherein the charge modifying agent is an amine of the formula:

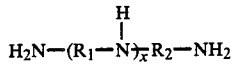

wherein $R^1$ and $R^2$ are alkyl of 1 to 4 carbon atoms and x is an integer from 0 to 4.

17. The process of claim 16, wherein $R_1$ and $R_2$ are ethyl.

18. The process of claim 1 or 2, wherein the amine is tetraethylene pentamine of the formula:

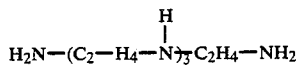

19. The process of claim 18, wherein the polyepoxide is 1,4-butanediol diglycidyl ether of the formula:

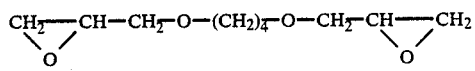

20. The process of claim 1 or 2, wherein the polyepoxide is a di- or tri-epoxide.

21. The process of claim 20, wherein the polyepoxide has a molecular weight of from about 146 to about 300.

22. The process of claim 1 or 2, wherein the polyepoxide has the formula:

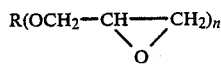

wherein R is an alkyl of 1 to 6 carbon atoms and n is an integer from 2 to 3.

* * * * *